Figure 1:
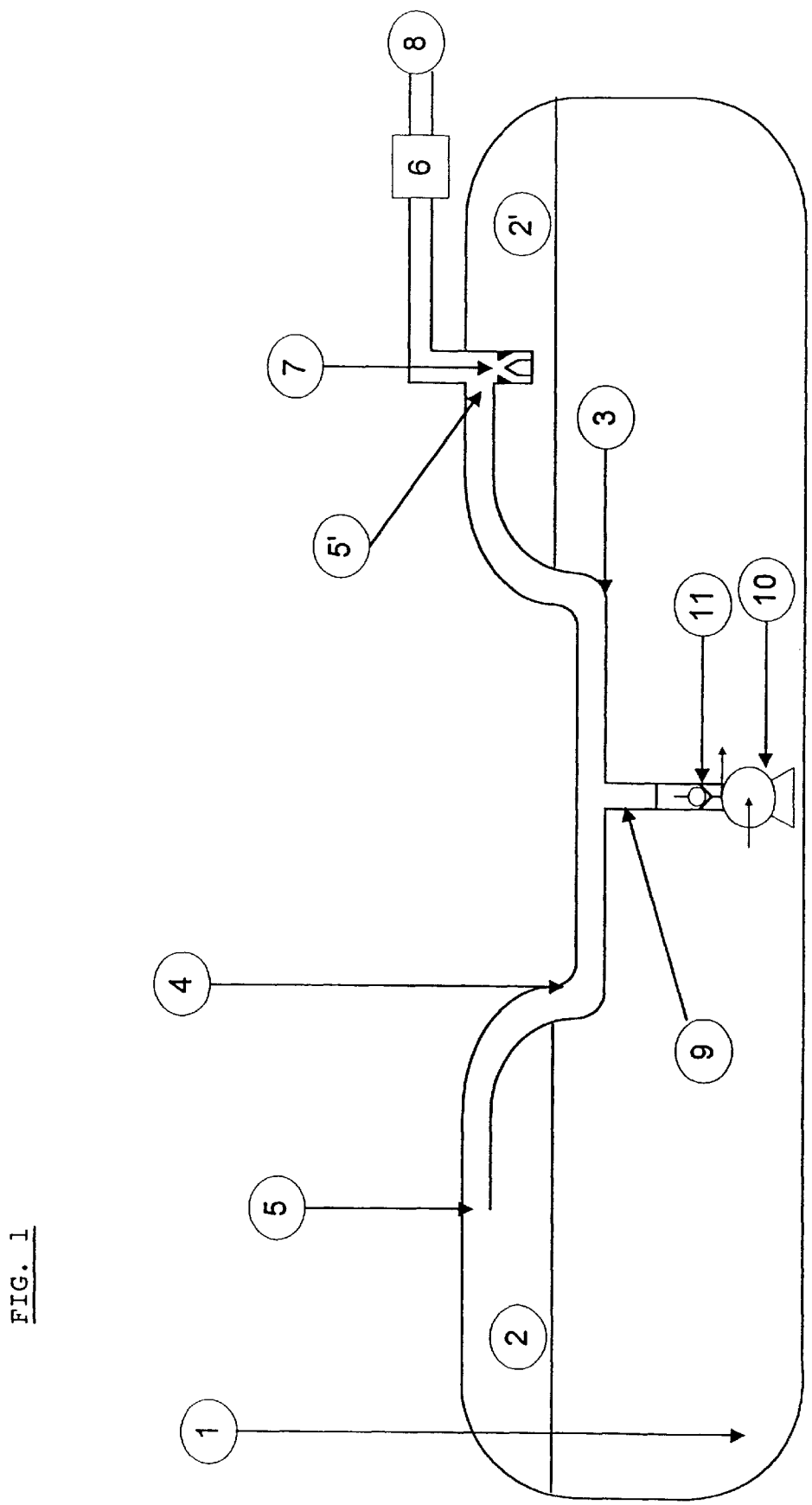

United States Patent
Thibaut et al.

[11] Patent Number: 6,089,249
[45] Date of Patent: Jul. 18, 2000

[54] VENTING CIRCUIT FOR A LIQUID TANK

[75] Inventors: Denis Thibaut, Halle; Jules-Joseph Van Schaftingen, Wavre; Paul Wouters, Vilvoorde, all of Belgium

[73] Assignee: Solvay (Societe Anonyme), Brussels, Belgium

[21] Appl. No.: 09/271,863

[22] Filed: Mar. 18, 1999

[30] Foreign Application Priority Data

Mar. 18, 1999 [FR] France .................................. 98 03409

[51] Int. Cl.⁷ .................................................. F16R 24/04
[52] U.S. Cl. ........................ 137/202; 137/574; 137/587; 123/516
[58] Field of Search ................... 137/202, 574, 137/587; 123/516

[56] References Cited

U.S. PATENT DOCUMENTS

| | | | |
|---|---|---|---|
| 3,800,978 | 4/1974 | Sigwald | 137/587 X |
| 5,054,528 | 10/1991 | Saitoh | 137/587 X |
| 5,275,145 | 1/1994 | Tuckey | 123/516 X |
| 5,392,804 | 2/1995 | Kondo et al. | 137/202 |
| 5,647,334 | 7/1997 | Miller | 137/574 X |
| 5,769,057 | 6/1998 | Hashimoto et al. | 123/516 |
| 5,868,119 | 2/1999 | Endo et al. | 123/516 |
| 5,870,997 | 2/1999 | Mukai | 137/574 X |

FOREIGN PATENT DOCUMENTS

| | | |
|---|---|---|
| 3224943 A1 | 1/1984 | Germany . |
| 3342871 A1 | 6/1985 | Germany . |
| 43 11 471 A1 | 10/1994 | Germany . |
| 05310050 | 11/1993 | Japan . |

*Primary Examiner*—John Rivell
*Attorney, Agent, or Firm*—Venable

[57] ABSTRACT

Venting circuit for a liquid tank, the upper wall of which comprises at least two regions liable to contain pockets of gas, the said circuit consisting of at least one ventilation tubing connecting ventilation points located in the upper part of the regions and a vent, and having at least one siphon-shaped lower part connected via a pipe to a point under vacuum inside the tank so as to allow the liquid present in the venting circuit to be removed, the vacuum being created by the pump for drawing off the liquid.

10 Claims, 2 Drawing Sheets

VENTING CIRCUIT FOR A LIQUID TANK

The present invention relates to a venting circuit for a liquid tank, particularly for a fuel tank fitted to a motor vehicle.

Liquid tanks, particularly fuel tanks for motor vehicles, generally include a venting circuit. This circuit allows the air and gases present in the tank, above the liquid, to be removed. It thus prevents pressurization of the tank or the creation of a vacuum therein as a result of variations in liquid volume that are due especially to fluctuations in temperature or in atmospheric pressure or to the drop in level as the liquid is drawn off.

For reasons of space constraint and, in particular, of the internal design of the vehicle, the tank may have a complex shape. Especially for this purpose, it is advantageously made of a thermoplastic. It often includes, in its upper wall, indentations or regions liable to contain independent pockets of gas when the liquid reaches a high level in the tank and/or when the vehicle is on an incline. Each of these regions must therefore include at least one ventilation point in order for it to be vented. The various ventilation points may be connected directly to the external environment (parallel connection) or, more simply, they may be connected together with a single vent. In the latter case, given the geometry of the tank, the tubing or tubings connecting the ventilation points generally include one or more lower parts in the form of a siphon. The effectiveness of one or several ventilation points may consequently be compromised if a liquid block obstructs this or these parts, as a result, for example, of a change in inclination of the tank or of a wave motion.

A known solution for preventing the formation of this liquid block consists in providing each ventilation point with a float valve. This solution is expensive and, moreover, does not make it possible to prevent liquid drops or drops of condensed gases from accumulating in certain parts of the venting circuit, especially in the siphon or siphons, and from obstructing the venting circuit.

German Patent 4,311,470 relates to a venting circuit for a fuel tank of a motor vehicle, which includes two domes connected by a tubing in the form of a U, the ends of which each terminate in the upper part of one of the two domes. The lower part of this tubing is connected by a pipe to a pump having a jet actuated by the flow of excess fuel returning from the motor. The solution proposed in this patent is obviously applicable only to fuel feed systems having an excess fuel return and not to systems in which the flow is controlled so as to avoid this excess. Furthermore, the effectiveness of the system proposed varies with the speed of the motor, since the latter determines the consumption and therefore also the return of excess fuel.

The object of the invention is consequently to propose a venting circuit for a liquid tank, the upper wall of which comprises at least two regions liable to contain pockets of gas, the said circuit consisting of at least one ventilation tubing having at least one siphon-shaped part, in which the formation of a liquid plug is avoided by a reliable and inexpensive device which is compatible with any type of liquid feed (with or without a return to the tank) and the efficiency of which is constant, whatever the speed of the motor.

The invention therefore relates to a venting circuit for a liquid tank, the upper wall of which comprises at least two regions liable to contain pockets of gas, the said circuit consisting of at least one ventilation tubing connecting ventilation points located in the upper part of the regions to a vent, and having at least one siphon-shaped lower part connected via a pipe to a point under vacuum inside the tank so as to allow the liquid present in the venting circuit to be removed, which is characterized in that the vacuum is created by the pump for drawing off the liquid.

The liquid tank includes, in its upper wall, regions liable to contain pockets of gas, which may or may not occur simultaneously, when the liquid reaches a high level in the tank and/or when the tank is on an incline. In particular, these regions are each in the form of a dome. In a specific embodiment, the tank includes, in its upper wall, two regions as defined above.

The expression "venting circuit" should be understood to mean the device which allows the gases present in these pockets to be removed and which prevents pressurization of the tank or the creation of a vacuum therein as a result of variations in liquid volume due especially to fluctuations in temperature or in atmospheric pressure or to the drop in the level of liquid as the latter is drawn off. It includes ventilation points which are located in the upper part of the regions where the pockets of gas might occur, above the maximum permitted liquid level in the tank, and which are connected together and to the vent by at least one ventilation tubing.

The term "vent" should be understood to mean any standard device allowing the gases contained in the tank to be discharged to atmosphere, these gases optionally being purified, by means of a filter such as a canister, for environmental reasons.

Excellent results have been obtained when the ventilation tubing connects the various ventilation points present in each region liable to contain a pocket of gas.

The venting circuit may consist of one or more elements made of one or more materials, and in particular a thermoplastic. Advantageously, the ventilation tubing or tubings and the pipe are based on one or more thermoplastics. The word "thermoplastic" should be understood to mean one or more thermoplastic polymers. The polymers may be homopolymers, copolymers or blends thereof. By way of such polymers, it is possible to use, for example, polyolefins, polyamides, polyketones or fluoropolymers. Good results have been obtained using polyamides.

Of course, one or more of the usual additives, such as antioxidants, stabilizers, pigments or the like, may be added to the thermoplastic.

The venting circuit has a geometry, a configuration and dimensions which are adapted in a known manner to the available space, to the design of the environment internal and/or external to the tank as well as to the functional requirements.

The pump for drawing off the liquid is a pump of any known type, actuated by any motor and intended to draw off liquid from the tank in order to feed a circuit for delivering this liquid. It thus creates a vacuum where the pipe connected to the lower part of the siphon emerges. This vacuum is generally constant, most fuel feed systems, with or without an excess fuel return, working with a constant feed-pump flow rate. The venting circuit according to the invention is therefore, in general, always effective, whatever the speed of the motor.

The venting circuit is intended for any tank. However, advantageously it is fitted to a tank for motor vehicles. Excellent results have been obtained with a fuel tank.

Advantageously, a non-return device is placed at the end of the pipe, allowing the liquid to be removed and emerging at that point inside the tank which is under vacuum. This device is of any known type, such as a non-return valve for example. It prevents the liquid from rising in the pipe connecting the lower part of the siphon to that part in the tank which is under vacuum when the motor which actuates the pump is stopped.

The abovementioned non-return valve is often a float valve, generally comprising a chamber which allows the gases to pass through it and a moving member which slides in the chamber in order to block off a connection orifice between two cavities. When the liquid rises in the cavity where the moving member is located, and reaches the latter, this member starts to float on the surface of the liquid and, by sliding in the chamber, blocks off the orifice for connection to the other cavity. A device which ensures that the valve is sealed in its closed position is preferably associated with it in a known manner.

The ventilation points may be connected together via one or more ventilation tubings. Advantageously, they may be connected in series by a single ventilation tubing which passes in succession through various regions, the final ventilation point being connected to the vent via the final section of the ventilation tubing.

Particularly advantageous results have been obtained with a venting circuit comprising a meshed network of ventilation tubings connecting the ventilation points. The expression "meshed network" should be understood to mean an enmeshment of tubings that are interconnected, more or less regularly, at several places. Preferably, the meshed network connects, in a homogeneous manner, all the regions where there may be pockets of gas. In one particular embodiment, several ventilation points are provided within one or more regions. The fact of having several interconnected ventilation points in certain regions thus makes it possible to guarantee at least one connection to the vent, whatever the severity or the direction of the inclination of the tank.

In the case of a tank liable to be subjected to movements, there is a substantial reduction in the acoustic emission because of these multiple means of communication between the various pockets of gas.

When the invention is used with such a meshed circuit, a reliable and inexpensive venting circuit, compatible with any feed device is obtained, this circuit furthermore reducing acoustic emission in the event of the tank moving.

The invention consequently also relates to a venting circuit as described above, in which the ventilation tubings form a meshed network connecting ventilation points. Advantageously, this meshed network interconnects the various regions where pockets of gas may occur.

According to a particular embodiment, one or more ventilation points are advantageously provided with a float valve, as described above, in order to prevent the venting circuit from being obstructed when the tank is in a particular situation.

In the case in which the ventilation points are connected in series, all the ventilation points apart from the first of the series (the furthest from the vent) are advantageously provided with a float valve.

In the case in which the ventilation points are connected in a meshed network, all the ventilation points are advantageously provided with a float valve.

By virtue of the presence of these float valves at the points indicated, the device is also effective in the event of the motor which actuates the pump for drawing off the liquid stopping when the tank is full and/or inclined.

In order to avoid in any situation, liquid, escaping to atmosphere, especially when the tank is upside down, the final section of the ventilation tubing may advantageously be provided with a non-return valve preventing the liquid from passing through it.

The venting circuit according to the invention may be external or, completely or partly, internal to the liquid tank. However, the venting circuit will preferably be internal to the liquid tank.

The liquid tank may be made of any known material. Preferably, it is based on a thermoplastic. It may be obtained in any known way, either directly as a single piece or by joining several parts together. However, the construction of the ventilation tubing or tubings is easier when there is direct access to the internal upper wall of the tank. Consequently, the tank will preferably be obtained by joining two preformed parts together.

The venting circuit described above guarantees ventilation of the liquid tank by a reliable and inexpensive device compatible with any type of liquid feed (with or without a return to the tank). It is therefore advantageously associated with a liquid tank.

The invention consequently also relates to a liquid tank fitted with a venting circuit as defined above.

Figure 2:
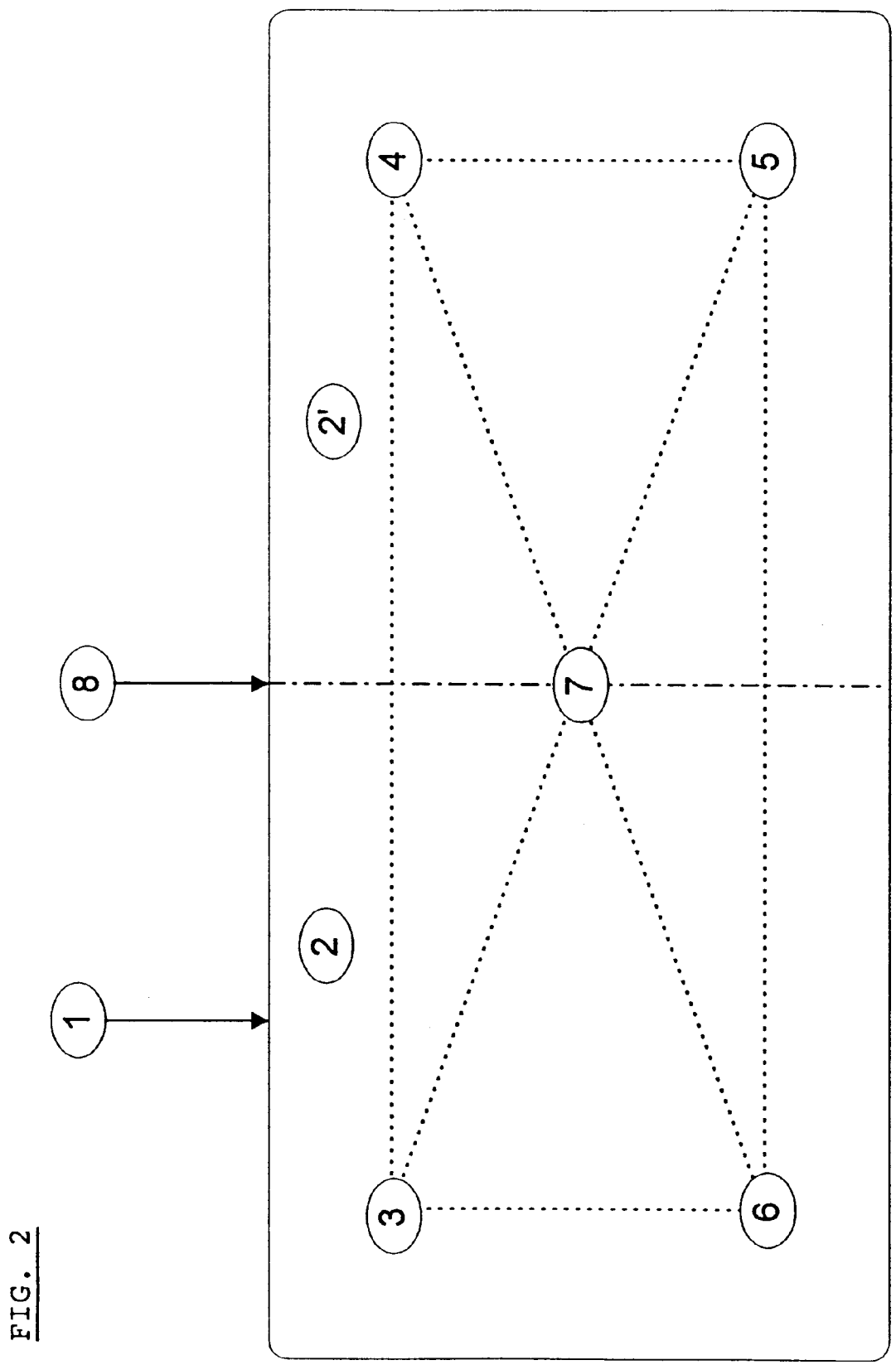

The invention is illustrated in a non-limiting manner by FIGS. 1 and 2.

FIG. 1 shows a motor-vehicle fuel tank (1) comprising two domes (2) (2') in its upper wall, which contain independent pockets of gas when the fuel level reaches or exceeds the mating plane between the domes (3) or even a level below this mating plane when the tank is inclined.

A venting circuit according to the invention is fitted inside the fuel tank comprising two ventilation points (5) (5') connected in series to the vent (8) via a ventilation tubing (4), the ventilation point preceding the vent (5') being provided with a float valve (7) and furthermore comprising a siphon-shaped lower part connected to the vacuum, generated by the pump (10) for drawing off the liquid, via a pipe (9) provided at its base with a non-return valve (11).

The fuel feed system is such that the vacuum created by the pump is constant whatever the speed of the motor.

The vent (8) is preceded by a non-return valve (6) in order to prevent, in any situation, liquid from escaping to the atmosphere, especially when the tank is upside down.

When the motor is rotating, whatever the inclination and the filling level of the tank, any fuel present in the ventilation tubing (4) falls under gravity into the pipe (9) where it is sucked up by the vacuum created by the pump (10) so as to bring the fuel level in the pipe (9) back below the fuel level in the tank, the difference in levels depending on the vacuum created by the pump. This is constant, whatever the speed of the motor.

When the motor is stopped, and therefore the pump (10) too, the non-return valve (11) prevents the fuel from rising in the pipe (9). Furthermore, if the vehicle has stopped in an inclined position, with the ventilation point (5') downwards, the float valve (7) prevents fuel from entering the ventilation tubing (4) and therefore prevents a fuel block from forming which would prevent ventilation of the dome (2).

FIG. 2 shows, diagrammatically, the upper wall of a motor-vehicle fuel tank having a meshed network of ventilation tubings connecting the various ventilation points provided with float valves.

As in the case in FIG. 1, the fuel tank (1) comprises two domes (2)(2') placed on either side of the mid-plane (8).

The meshed network of ventilation tubings connects the ventilation points located at each of its nodes (3) (4) (5) (6), except at the central point (7). These ventilation points each include a float valve (not shown). The tubings of the network include siphon-shaped lower parts in the region of the mid-plane (8). The central point (7) is linked to the vent but also, via a pipe, to the vacuum created by the pump (not shown) for drawing off the fuel. This pipe is provided with a non-return valve at its base, close to the junction with the pump.

As in the case in FIG. 1, the venting circuit operates in a constant manner, whatever the speed of the motor, and also when the motor is stopped.

Furthermore, when the vehicle is moving, the acoustic emission resulting from movement of the fluids in the tank is attenuated as a result of the multiple means of communication between the two pockets of gas.

What is claimed is:

1. Venting circuit for a liquid tank, the upper wall of which comprises at least two regions liable to contain pockets of gas, the circuit consisting of at least one ventilation tubing connecting ventilation points located in the upper part of the regions and having at least one siphon-shaped lower part connected via a pipe to a point under vacuum inside the tank so as to allow liquid present in the venting circuit to be removed, wherein the vacuum is created by a pump for drawing off the liquid.

2. Venting circuit according to claim 1, in which the liquid tank is a fuel tank.

3. Venting circuit according to claim 1, in which a non-return device is placed at the end of the pipe allowing the liquid to be removed and emerging at a point under vacuum inside the tank.

4. Venting circuit according to claim 1, in which the ventilation points are connected in series by a single ventilation tubing which passes in succession through various regions, the final ventilation point being connected to a vent via a final section of the ventilation tubing.

5. Venting circuit according to claim 1, in which the ventilation tubings form a meshed network connecting ventilation points.

6. Venting circuit according to claim 5, in which the meshed network interconnects various regions.

7. Venting circuit according to claim 1, in which at least one ventilation point is provided with a float valve.

8. Venting circuit according to claim 1, in which the venting circuit is internal to the liquid tank.

9. Venting circuit according to claim 1, in which the liquid tank is obtained by joining two preformed parts together.

10. Liquid tank fitted with a venting circuit according to claim 1.

* * * * *